(12) United States Patent
Wilson et al.

(10) Patent No.: US 11,274,740 B2
(45) Date of Patent: Mar. 15, 2022

(54) LUBRICATION SYSTEM FOR AN AXLE DRIVE

(71) Applicant: BorgWarner Sweden AB, Landskrona (SE)

(72) Inventors: Karl Wilson, Kvidinge (SE); Magnus Persson, Viken (SE)

(73) Assignee: BorgWarner Sweden AB, Landskrona (SE)

(*) Notice: Subject to any disclaimer, the term of this patent is extended or adjusted under 35 U.S.C. 154(b) by 368 days.

(21) Appl. No.: 16/336,636

(22) PCT Filed: Sep. 29, 2017

(86) PCT No.: PCT/EP2017/074811
§ 371 (c)(1),
(2) Date: Mar. 26, 2019

(87) PCT Pub. No.: WO2018/060446
PCT Pub. Date: Apr. 5, 2018

(65) Prior Publication Data
US 2021/0293327 A1    Sep. 23, 2021

(30) Foreign Application Priority Data

Sep. 29, 2016 (SE) .................................. 1651280-8
Sep. 30, 2016 (SE) .................................. 1651287-3

(51) Int. Cl.
*F16H 57/04* (2010.01)
*B60K 1/00* (2006.01)
*B60K 17/16* (2006.01)

(52) U.S. Cl.
CPC .......... *F16H 57/0445* (2013.01); *B60K 1/00* (2013.01); *B60K 17/165* (2013.01); *F16H 57/045* (2013.01); *F16H 57/0423* (2013.01); *F16H 57/0447* (2013.01); *F16H 57/0457* (2013.01); *F16H 57/0483* (2013.01); *B60K 2001/001* (2013.01); *F16H 57/0471* (2013.01)

(58) Field of Classification Search
None
See application file for complete search history.

(56) References Cited

U.S. PATENT DOCUMENTS 4,678,055 A    7/1987   Yoshinaka et al.
5,029,685 A    7/1991   Takase et al.
(Continued)

FOREIGN PATENT DOCUMENTS

CN    101050792 A2    10/2007
CN    101918739 A     12/2010
(Continued)

OTHER PUBLICATIONS

Swedish Application No. 1651280-8 Search Report dated Mar. 30, 2017 in the name of BorgWarner TorqTransfer Systems AB, 3 pages.
(Continued)

*Primary Examiner* — Dirk Wright
(74) *Attorney, Agent, or Firm* — Brooks Group, PLC

(57) ABSTRACT

An axle drive (1) for a vehicle is provided, comprising a differential (2) and an electrical motor (17) in driving connection with said differential (2) via a disconnect (7), wherein lubrication of said axle drive (1) is adjusted automatically by means of the position of said disconnect (7).

15 Claims, 4 Drawing Sheets

(56) References Cited

U.S. PATENT DOCUMENTS

| | | | |
|---|---|---|---|
| 5,624,344 A | 4/1997 | Yehl et al. | |
| 5,839,327 A | 11/1998 | Gage | |
| 7,211,025 B2 * | 5/2007 | Fujioka | B60K 6/387 |
| | | | 477/8 |
| 9,410,610 B1 | 8/2016 | Pritchard et al. | |
| 2005/0107203 A1 | 5/2005 | Wittkopp | |
| 2005/0139401 A1 | 6/2005 | Fujioka | |
| 2006/0166788 A1 | 7/2006 | Buchhold | |
| 2006/0223670 A1 | 10/2006 | Nishikawa et al. | |
| 2009/0173579 A1 | 7/2009 | Vu | |
| 2015/0057124 A1 | 2/2015 | Pump | |

FOREIGN PATENT DOCUMENTS

| | | | | |
|---|---|---|---|---|
| CN | 104781589 A | | 7/2015 | |
| DE | 102010039447 A1 | | 2/2012 | |
| DE | 102012219182 A1 | | 5/2014 | |
| EP | 1950076 A1 | | 7/2008 | |
| EP | 2168802 A1 | | 3/2010 | |
| EP | 2851227 A1 | | 3/2015 | |
| GB | 2474155 A | | 4/2011 | |
| JP | 2002115685 A | | 4/2002 | |
| JP | 2005106232 A | | 4/2005 | |
| JP | 2015209849 A | | 11/2015 | |
| WO | WO-2012159787 A1 | * | 11/2012 | ......... F16H 57/0426 |
| WO | 2013038943 A1 | | 3/2013 | |
| WO | WO-2013136589 A1 | * | 9/2013 | ......... F16H 57/0476 |

OTHER PUBLICATIONS

English Translation of Chinese Office Action with Search Report dated Dec. 21, 2021 ; Application No. 201730060488.9 ; Applicant: BorgWarner Sweden AB; 11 pages.

* cited by examiner

LUBRICATION SYSTEM FOR AN AXLE DRIVE

This application claims the benefit of Swedish Application No. 1651280-8 filed Sep. 26, 2016, Swedish Application No. 1651287-3 filed Sep. 30, 2016 and PCT Application No. EP2017/074811 filed Sep. 29, 2017.

TECHNICAL FIELD

The present invention relates to a lubrication system for an axle drive, in particular to an electric rear axle drive.

BACKGROUND

Axle drives, such as electrical rear axle drives, may be provided with a disconnect for selectively disconnect the rotating parts from the drivetrain. The disconnect, which normally is provided as a dog clutch, will upon disengagement prevent rotational connection between the electric motor, used to provide driving torque to the axle drive, and the differential mechanism of the axle drive.

The demands for efficient lubrication will typically vary during operation of the axle drive, and it would therefore be advantageous to provide a solution which allows for improved lubrication.

SUMMARY

In view of the drawback presented above, an object of the present invention is to provide a solution to this problem. The inventors have surprisingly realized that optimal lubrication depends on the current position of the disconnect, and an idea of the present invention is therefore to provide a simple solution which allows for an automatically increased lubrication during connect mode of the disconnect.

According to a first aspect an axle drive for a vehicle is provided, the axle drive comprising a differential and an electrical motor in driving connection with the differential via a disconnect, wherein lubrication of the axle drive is adjusted automatically by means of the position of the disconnect. Preferred embodiments are defined by the appended dependent claims.

BRIEF DESCRIPTION OF THE DRAWINGS

Embodiments of the invention will be described in the following; reference being made to the appended drawings which illustrate non-limiting examples of how the inventive concept can be reduced into practice.

DETAILED DESCRIPTION

Figure 1:
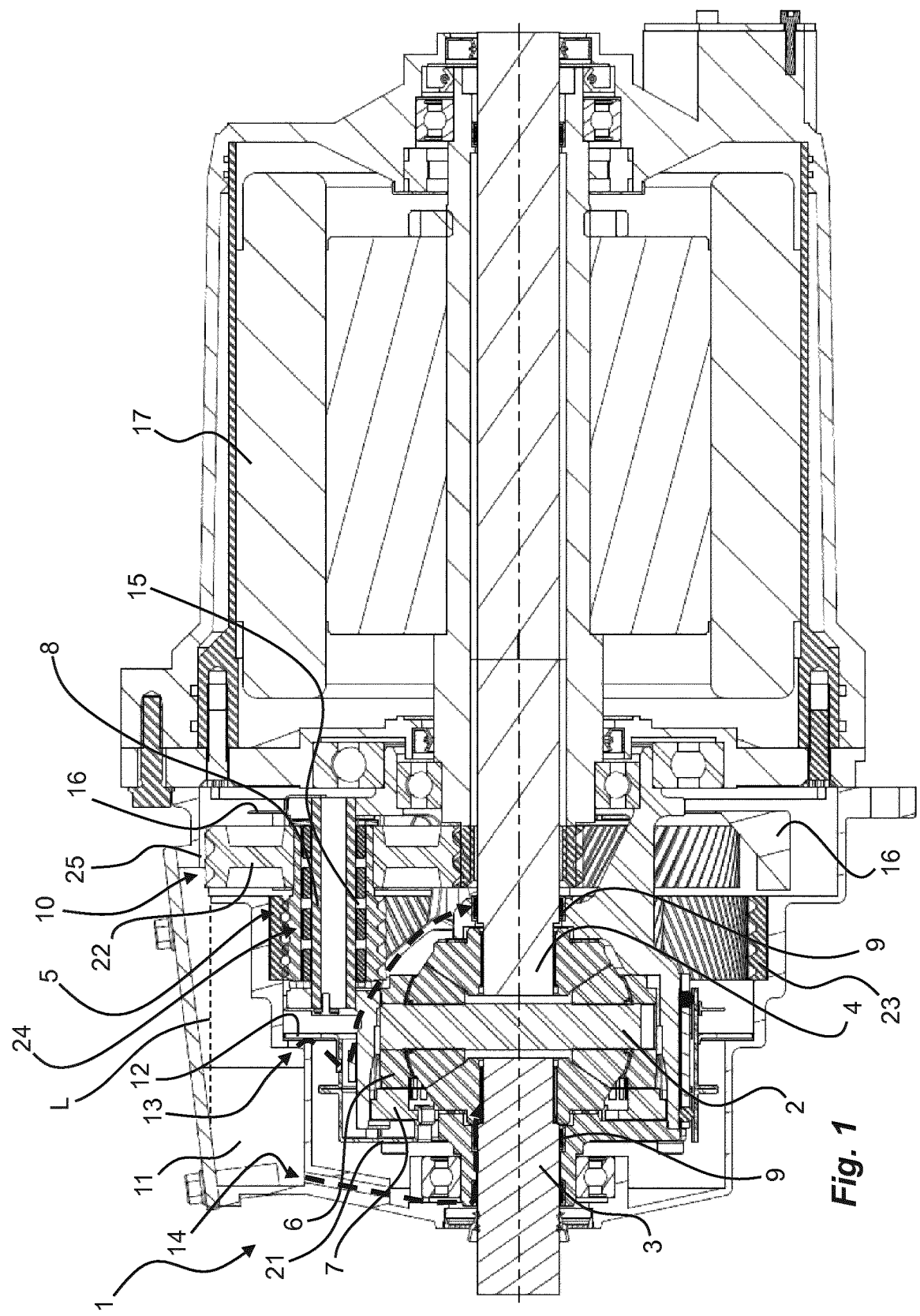
FIG. 1 is a cross-sectional view of an axle drive according to an embodiment in which the disconnect is arranged in a non-engaged state.
Figure 2:
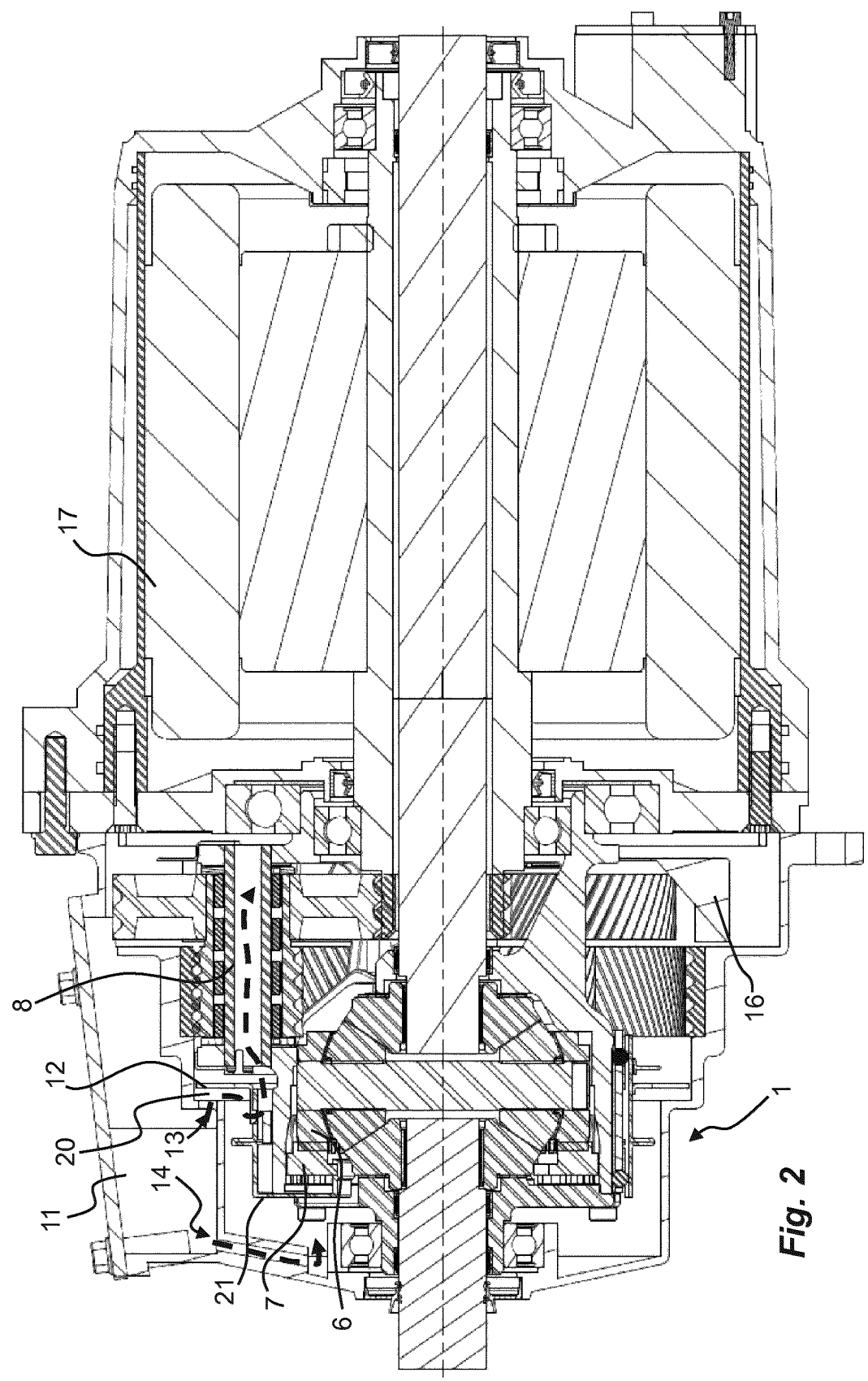
FIG. 2 is a cross-sectional view of an axle drive according to an embodiment in which the disconnect is arranged in an engaged state.

In FIGS. 1 and 2 an axle drive 1 is shown. The axle drive 1 comprises a differential 2 in driving connection with two opposite drive shafts 3, 4. A planetary gearing 5 is provided which receives driving torque from an electrical motor 17 arranged coaxially on one of the drive shafts 4.

A cage 6 of the differential 2 may comprise a planet carrier central shaft 8 arranged to rotate around the differential 2. A first planet gear 24 arranged on planet carrier 8 may engage with ring gear 23. A second planet gear 22 arranged on planet carrier 8 may engage with a sun gear disposed coaxially on outgoing drive shaft 4. The electrical motor 17 will, upon activation, drive the sun gear whereby torque is transferred to the differential cage 6 via the planetary gearing 5.

The drive torque provided by the electrical motor 17 is transmitted through the planetary gearing 5 to the differential cage 6 of the differential via a disconnect 7. The disconnect 7 may be implemented in various forms known per se, but is here illustrated as an actuating sleeve which position can be shifted to connect the differential cage 6 to the central shaft 8 of the planetary gearing 5.

FIG. 1 shows the axle drive 1 in disconnected mode, while FIG. 2 shows the axle drive 1 in connected mode.

Typically only the radial needle bearings 9 on the drive shafts 3, 4 need to be lubricated in disconnect mode.

In disconnect mode, oil flow is choked by a plate or washer 12 connected to the disconnect sleeve 7.

A side reservoir 11 is provided, which receives oil from an oil inlet 10. The oil reaches the inlet 10 as the planetary gearing 5 is rotating.

The maximum oil level inside the reservoir 11 is indicated by the dashed line L.

By restricting the oil flow out from the reservoir 11, (outflow is possible through outlets 13, 14) by means of the position of the washer 12, the oil level in the reservoir will not lower as fast. When the oil level is too low the electrical motor is activated for a short time, thereby accelerating the planetary gearing 5 to throw out new oil into the reservoir 11. The oil flow out from the reservoir 11 is indicated by the dashed lines drawn from oil ports 13, 14.

In connect mode, i.e. when the disconnect sleeve 7 has been activated as seen in FIG. 2, the flow choking washer 12 is moved to the right which gives a greater oil flow out from the reservoir 11, especially through outlet 13. The oil is allowed to flow through the washer 12, as shown by the dashed lines, and then further into the central shaft of the planet carrier 8 to lubricate the needle bearings 15 for the planet gears.

The remaining gears are thereby lubricated through splashing.

Figure 3:
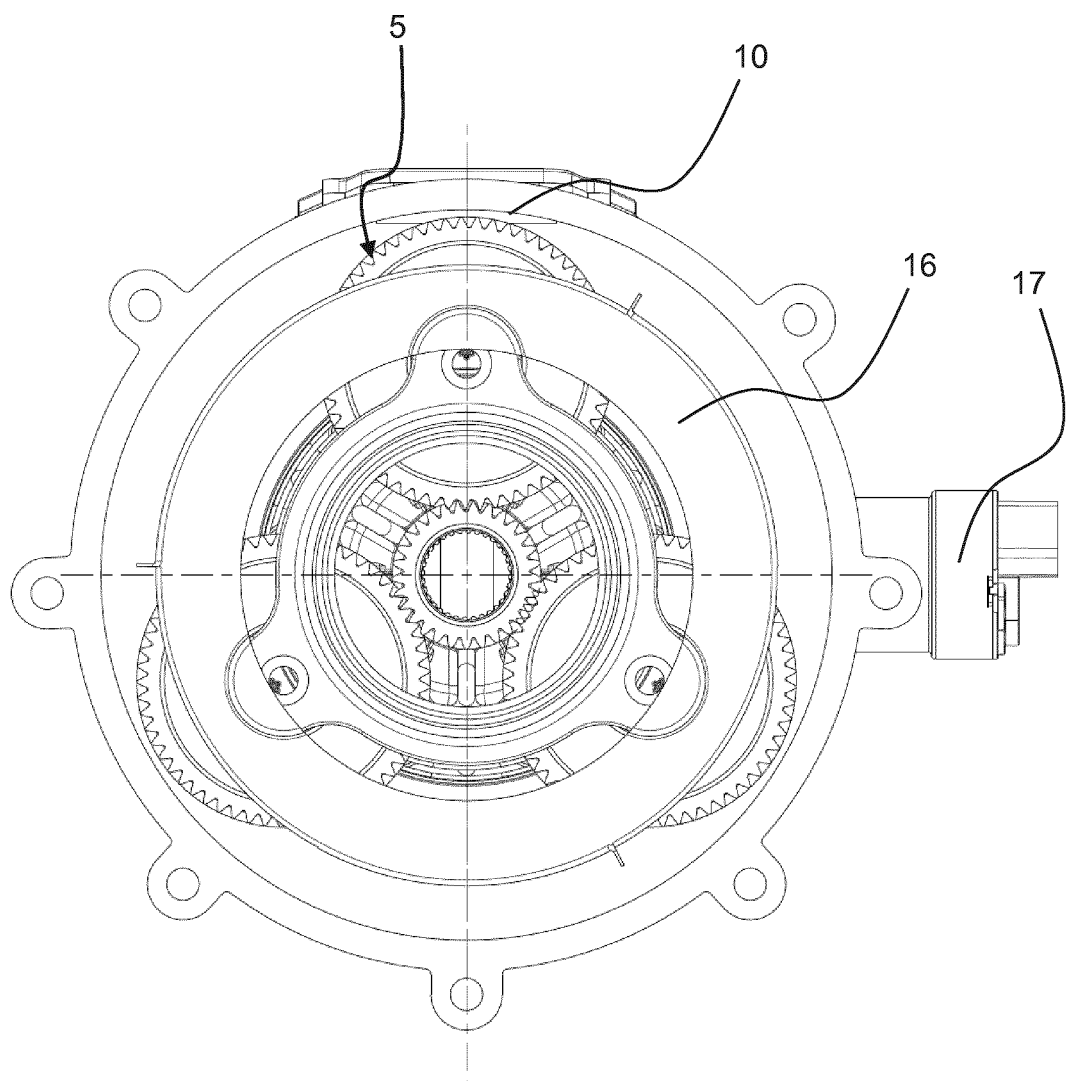
FIG. 3 is a side view of a planetary gearing for use with an axle drive according to an embodiment.

The planetary gearing 5 is shown in FIG. 3. A plastic part 16 is arranged around the planet gears to assist in throwing out oil into the reservoir 11. Also, in FIG. 3 the actuator 18 is shown for controlling the position of the disconnect 7.

Figure 4:
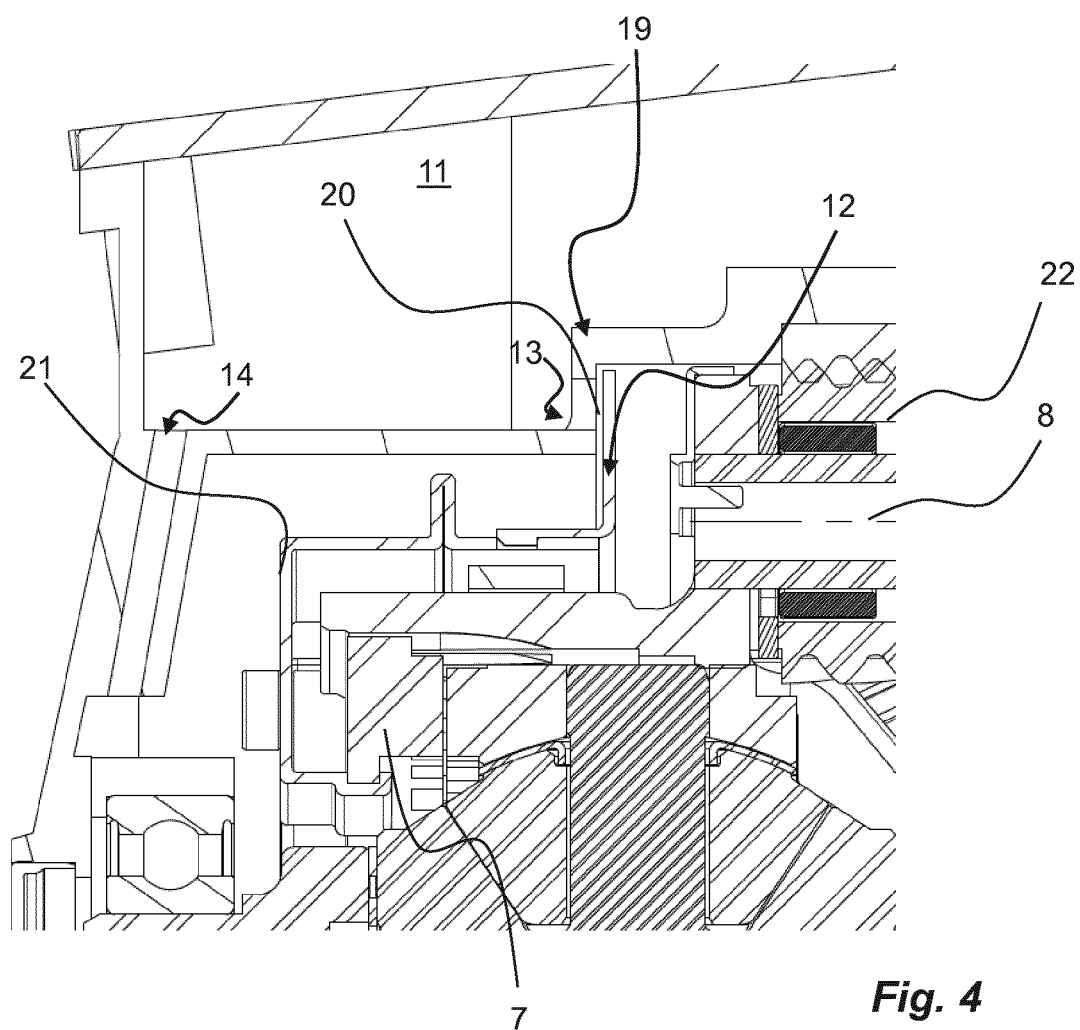
FIG. 4 is a cross-sectional detailed view of the axle drive of FIG. 1.

Again returning to FIGS. 1 and 2, as well as to FIG. 4, the washer 12 may comprise a plate member which has a flat surface which chokes the outflow of oil from the reservoir 11 at port 13 when the disconnect sleeve 7 is in the disconnected position. The washer 12 may have a U-shape portion 21, wherein the oil flow choking part of the washer 12 extends at a right angle from the U-shaped portion 21 radially outwards. According to an embodiment, the washer 12 may be disposed parallel to an inner wall of a gear casing 19 and/or an outer wall of the reservoir 11, forming therewith a column 20 in connect mode and in disconnect mode of the disconnect sleeve 7. The column 20 may constitute a channel through which oil may flow from the reservoir 11 in the connect state of the disconnect sleeve 7. The column 20 may also constitute a channel through which oil may flow from the reservoir 11 in disconnect state of the disconnect sleeve 7. The washer 12 may e.g. comprise a concave shape having a diameter being larger than a diameter of the reservoir outlet 13, 14. The washer 12 may e.g. comprise a convex shape having a diameter being larger than a diameter of the reservoir outlet 13, 14. The washer 12 may be adapted to allow a flow of oil from reservoir 11 under all circumstances.

The outer diameter of the washer 12 may be larger than the diameter of outlet 13. One advantageous effect of this configuration is that as oil is flowing out from outlet 13, e.g. in the disconnect mode, the oil may spread out in the column 20 radially from the outlet 13 whereby the washer 12 having an outer diameter being larger than the outlet 13 collects the oil which is radially spread out. The collected oil may then be led downwards along the washer 12 by means of gravity.

The washer 12 may comprise a rectangular plate. The washer 12 may comprise a substantially rectangular plate. The washer 12 may comprise a circular shape. The washer 12 may comprise a rectangular and semi-circular plate.

According to further aspects, the washer 12 may comprise a plate member or likewise flat surface which chokes the outflow of oil from the reservoir 11 when the disconnect sleeve 7 is in the disconnected position, the choking member may be disposed parallel to an inner wall of the gear casing 19 and/or an outer wall of the reservoir 11. An outer diameter of the washer 12 may be larger than a diameter of the outlet 13. The washer 12 may comprise a through hole having a diameter being smaller than the diameter of the outlet 13.

The washer 12 may be disposed such that the through hole of the washer 12 is arranged within the radius of the outlet 13.

The washer 12 may be connected to the disconnect sleeve 7 such that the washer 12 abuts the surface of the gear casing 19 in which the outlet 13 is arranged.

The washer 12 may be connected to the disconnect sleeve 7 such that the through hole of the washer 12 is arranged within the radius of the outlet 13 when the disconnect collet 7 is in the disconnect position.

The washer 12 may be connected to the disconnect sleeve 7 such that the through hole of the washer 12 is arranged coaxial to the outlet 13 when the disconnect sleeve 7 is in the disconnect position.

The washer 12 may be connected to the disconnect sleeve 7 such that the through hole of the washer 12 is arranged coaxial the outlet 13 when the disconnect sleeve 7 is in the connect position.

The washer 10 may thereby function to at least partially prevent oil to flow out from said reservoir outlet 13, 14. The washer 12 may thus impose a valve for the supply of lubricating oil from reservoir 11 when the disconnect sleeve 7 is in the disconnect position. However, according to some embodiments, the washer 12 may be adapted to allow a certain flow of oil from reservoir 11 under both connect mode and disconnect mode of the disconnect sleeve 7.

In the disconnect position of the disconnect sleeve 7, the washer 12 restrict the flow from reservoir 11 as disclosed in FIG. 1, and when the disconnect sleeve 7 is in connect position the washer 12 is displaced away from the inner wall 19 and thereby the outlet 13 to increase the width of the column 20 and allow for an increased flow of oil from the reservoir 11 through the outlet 13 and through the column 20.

The column 20 may be planar i.e. extending in a plane or substantially extending in a plane, the plane being transverse the axial direction of the axles 3, 4.

The washer 12 may be displaceable in an axial direction of the axle drive 1, i.e. in an axial direction of the drive shafts 3, 4.

The washer 12 may be displaceable in an axial direction of the axle drive 1, i.e. in an axial direction of the drive shafts 3,4 which direction may equate to the direction that the disconnect sleeve 7 is displaced between the connect and disconnect position respectively. The extension direction of the column 20 is thereby always the same.

The washer 12 receives an oil flow from reservoir 11 and directs the flow of oil, typically downwards towards the differential 2 where the oil may be distributed into further flow paths for lubrication of moving parts such as bearings 9 and shaft 8.

According to some embodiments, the washer 12 is disposed outside the differential cage 6 and above the differential cage 6, the disconnect sleeve 7 being arranged inside the differential cage 6. The U-shaped portion 21 may facilitate direct mechanical connection between the disconnect sleeve 7 and the washer 12 such that that an axial displacement of the disconnect sleeve 7 e.g. from a disconnect position to a connect position cause a corresponding axial displacement of the washer 12. Thus, when the disconnect sleeve 7 is displaced a certain axial distance, the width of the column 20 is increased or decreased correspondingly with a 1:1 ratio.

As has been explained herein, the washer 12 may be disposed to extend in in a plane which is transverse the direction of flow through outlet 13, hence a plane which is transverse a center axis of outlet 13, through which oil flows from the reservoir 11. In addition, the washer 12 may be displaceable in a direction parallel a center axis of the outlet 13, the outlet 13 being in the form of a through hole. The washer 12 thus forms a choking member in the form of a cap or lid which is partially open in the connect position and in the disconnect position of the disconnect sleeve 7. The described configuration facilitates that the flow restricting element, in the form of the washer 12, may be disposed to extend in a plane which is transverse the direction of flow through outlet 13. In particular, the portion of the washer 12, i.e. the portion of the surface of washer 12 which faces the through hole of outlet 13 may extend in a plane which is transverse the center axis of the outlet 13.

It follows that the restricting element, in the form of the washer 13, may have a diameter being larger than the outlet 13.

The washer 12 may comprise a flat surface having no protrusions.

As discussed, the washer 12 may be disposed parallel a wall of the reservoir 19. The gear casing 19 may according to aspects constitute an inner wall of the reservoir 11.

The outlet 13 is arranged in the side wall of reservoir 11 and the washer 12 will, together with the side wall, form a column 20 between the wall and washer 12. In the disconnect mode, the displacement of the washer 12 may directly cause the width of the column 20 to be reduced, thereby causing increased resistance of the flow from outlet 13 and a smaller flow of oil as a consequence.

The column 20 may provide a flow channel in which the fluid flowing through the column 20 is restricted only in axial directions of the axle drive 1, i.e. in an axial direction of the drive shafts 3, 4. In particular the flow through the column 20 may be restricted on one hand by the washer 12 and on the other hand by gear casing 19 or the wall of the reservoir 11 in which the outlet 13 is arranged.

The column 20 may be uniform in shape; extending uniformly and transverse the center axis of the outlet 13.

When there is no oil present in the reservoir 11, the column may contain only air and when there is oil present in the reservoir 11, the column may contain only oil.

The oil in the reservoir 11 at the level of the outlet 13 is under the pressure of gravity, the pressure thus depending on the filling level of the reservoir 11 and the oil level of the reservoir 11. The pressure of the oil at the level of the outlet 13, 14 exert hydraulic pressure on the oil at that level to push the oil through outlets 13, 14. Thus, the pressure at the level of the outlets 13, 14 may be increased by supplying more oil to the reservoir 11, thereby increasing the pressure at the level of the outlets 13, 14.

The reservoir 11 may be disposed on an external side of the gear casing 19 encasing the moving parts of the differential gearing 2 and the planetary gearing 5, however the gear casing 19 may constitute one or more boundaries of the reservoir 11, such as inner walls of the reservoir 11. The reservoir 11 may thus form an integral part of the gear casing 19 while not being in contact with any moving parts. The reservoir 11 is separated from moving parts. Thereby, stirring losses of lubrication oil are eliminated.

The oil inlet 10 may be disposed at a level of the reservoir 11 being higher than the lowest point which may correspond to the lowest level of the reservoir 11. For example, the oil inlet may be disposed at the highest maximum level of the reservoir 11.

The oil entering the reservoir 11 via the oil inlet 10 may flow under the action of gravity to the lowest level of the reservoir 11 and in this manner fill up the reservoir 11. This may involve the reservoir 11 leading the oil in an axial direction of the axle drive 1 from the inlet 10 connecting to the planet gear 22, along the planetary gearing and on an external side of the gear casing 19 to the lowest level of the reservoir 11. The outlets 13, 14 may be disposed at the lowest level of the reservoir 11.

Outlet 13 may comprise a laterally extending orifice, extending in an axial direction of the axle drive 1 through the reservoir 11 to the inside of the gear casing 19. The outlet 13 may thus fluidly connect the exterior of the gear casing with the interior of the gear casing 19.

The washer 12 may extend in a plane transverse the direction of the flow of oil through outlet 13. The washer 12 may thereby constitute a barrier functioning as an oil-receiving member, receiving oil from the reservoir 11 and as a diverter diverting a fluid flow from the reservoir 11.

The outlet 13 may comprise one or more holes in the gear case 19. The outlet 14 may comprise one or more holes in the gear case 19.

One or more of the outlets 13 may have a corresponding washer 12. One washer 12 may restrict the flow of oil from one or more outlets 13.

One or more of the outlets 14 may have a corresponding washer 12. One washer 12 may restrict the flow of oil from one or more outlets 14.

The bottom of the reservoir 11 may incline from the outlet 13 to the outlet 14. The bottom of the reservoir may in other embodiments decline from the outlet 13 to the outlet 14.

A lowest point of the reservoir 11 may be disposed at a level being above the drive shaft of the planetary gearing 5. The lowest point of the reservoir 11 may also be disposed at a level being above the differential gearing 2 and the needle bearing 9. Also, one or more of the outlets 13, 14 may be disposed at a level of the reservoir 11 being above the drive shaft of the planetary gearing 5. One or more of the outlets 13, 14 may be disposed at a level of the reservoir 11 being above the differential gearing 2 and the needle bearing 9. One or more of the outlets 13, 14 may be disposed at the lowest point of the reservoir 11. The oil contained in the reservoir 11 may thereby have potential energy in relation to the level of the moving parts 2, 3, 4, 5, 6, 7, 8, 9 to be lubricated such that moving parts may be supplied with oil due to gravitational force alone as the flow of oil from the reservoir 11 will propagate from the outlet 13 to points of lubrication constituting a point of lower potential energy. In this sense, the reservoir 11 acts as a water tower, wherein the potential energy of the oil stored therein pushes lubricating oil through the conduits of the axle drive 1.

In the disconnect mode, disconnect sleeve 7 is in a disconnect position and the planetary gearing 5 disconnected from the cage 6 of the differential 2. When the disconnect sleeve 7 is displaced to the disconnect position, the disconnect sleeve 7 is displaced in an axial direction away from the reduction gearing 5. The disconnect sleeve 7 is connected to the washer 12 arranged between the planetary gearing 5 and the reservoir 11. The washer 12 is thus displaced towards the outlet 13 at the same rate as the disconnect sleeve 7 is displaced in a disconnect direction, corresponding to a decrease of the cross section of the column 20 which constitutes a channel for the oil flowing from the reservoir 11 through outlet 13. Accordingly, the washer 12 is thus displaced away from the outlet 13 at the same rate as the disconnect sleeve 7 is displaced in a connect direction, corresponding to an increase of the cross section of the column 20 which constitutes a channel for the oil flowing exiting the reservoir 11 through outlet 13.

The disconnect position and the connect position of the disconnect sleeve 7 and the washer 12 may constitute respective end-positions of the disconnect sleeve 7 and consequently also end-positions of the washer 12. In disconnect position the disconnect sleeve 7 is in an axial-end position wherein the distance between the washer 12 and the outlet 13 in the reservoir 11 is at a minimum, allowing a minimum of oil to exit the reservoir 11. In connect position the disconnect sleeve 7 is in an axial-end position wherein the distance between the washer 12 and the outlet 13 in the reservoir 11 is at a maximum, allowing a maximum of oil to exit the reservoir 11.

The cage 6 of the differential 2 may be connected to a planet carrier 8 arranged to rotate around the differential 2. A first planet gear 24 of planet carrier 8 may engage with ring gear 23. A second planet gear 22 of planet carrier 8 may engage with a sun gear disposed on outgoing drive shaft 4.

The electrical motor 17 may be activated at any time to drive the planetary gearing 5 causing the second planet gear 22 to revolve around drive shaft 4. The second planet gear 22 then performs an oscillating movement up and down within the gear casing 19; colleting lubricating oil at the bottom of the gear casing 19 and transporting it to the highest point of the planetary gearing 5, which may correspond to the highest point of the reservoir 11. Consequently, the lubricating oil which has been transported by the planet gear 22 splashes against the interior of the gear casing 19 due to centrifugal force caused by the rotating planet gear 22.

The U-shaped portion 21 of the washer 12 may slidably receive the disconnect sleeve 7. The disconnect sleeve 7 may rotate with the cage 6 in the connect position and be stationary in the disconnect position. The connection-shaped portion 21 may be a non-rotating member. The U-shaped portion 21 may comprise a groove which slidably receives the disconnect sleeve 7 such that the disconnect sleeve 7 may rotate in the groove. When the disconnect sleeve 7 is displaced in an axial direction, such as a disconnect direction or a connect direction, the disconnect sleeve 7 acts on the groove to cause the connection-shaped portion 21 to be displaced in an axial direction, thus causing washer 12 to be displaced in an axial direction towards the outlet 13 or away from the outlet 13 respectively.

A cover, which in one aspect is formed as a plastic part 16, may be adapted to at least partially envelope the second planet gear 22. In particular, the plastic cover 16 may extend at least partially radially outside a rotating gear, which gear teeth transport and throw the lubricating oil. The transporting gear may e.g. be the second planet gear 22. The second planet gear 22 rotates about its own axis and simultaneously rotates about a sun gear disposed on outgoing drive shaft 4. The cover 16 may be in the form of a collector, or a splash cover. Embodiments of the plastic part 16 may comprise a resilient flexible material. In further embodiment the plastic part 16 may comprise a stiff material. The plastic part 16 may extend from the planet carrier 8 and partially envelope the planet gear 22.

A horizontal space or column 25 may be formed between the second planet gear 22 and the interior inner rim of the plastic cover 16 which faces the planet gear 22. Accordingly, the lubricating oil is splashed against the inner rim. The plastic cover may thus have the function of receiving lubricating oil from the bottom of the gear casing 19 via planet gear 22. The lubricating oil is received by plastic cover 16 and lead into the oil inlet 10, thereby suppling the reservoir 11 with oil and filling it up.

The electrical motor 17 may be activated at any time, regardless whether the disconnect sleeve 7 is in the connect or the disconnect position. Hence, the planetary gearing 5 may be actuated to rotate regardless whether the disconnect sleeve 7 is in connect or disconnect position. In the disconnect position the electric motor 17 will not provide any torque to the outgoing drive shafts 3,4. Thus, the reservoir 11 may be supplied with oil regardless whether the disconnect sleeve 7 is in connect or disconnect position.

The filling of the reservoir 11 with oil may be carried out when the disconnect sleeve 7 is in the connect position and in the disconnect position. Hence, filling of the reservoir 11 may be carried out independent whether the electric motor 17 and the planetary gearing 5 is connected to the differential 2.

The plastic part 16 may provide a space between planet gear 22 and the plastic part 16, which space is in direct communication with oil inlet 10. Oil inlet 10 may be disposed vertically above the planetary gears of the planetary gearing.

The invention claimed is:

1. An axle drive for a vehicle, comprising a differential and an electrical motor in driving connection with said differential via a disconnect, wherein lubrication of said axle drive is adjusted automatically by means of the position of said disconnect said axle drive further comprising an oil reservoir receiving oil splashing from a reduction gear arranged between the electrical motor and the disconnect, said reservoir comprising one or more outlets for allowing oil to exit said reservoir.

2. The axle drive according to claim 1, wherein said reduction gear is a planetary gearing.

3. The axle drive according to claim 1, wherein a plastic part is arranged around said reduction gear to assist in throwing oil into said reservoir.

4. The axle drive according to claim 1, wherein said disconnect comprises a washer arranged adjacent to one of said reservoir outlets, and wherein the washer, when the disconnect is in a disconnected position, at least partially prevent oil to flow out from said reservoir outlet.

5. The axle drive according to claim 1, further comprising a control unit configured to activate the electrical motor when the disconnect is arranged in a disconnected state, in order to fill up the reservoir.

6. The axle drive according to claim 1, wherein said outlet is arranged at a vertical portion of a gear casing separating said reservoir from said differential and from said reduction gearing.

7. The axle drive according to claim 4, wherein said washer and said vertical portion of said gear casing forms a vertical column there between.

8. The axle drive according to claim 7, wherein said outlet fluidly connects said reservoir to said vertical column.

9. The axle drive according to claim 1, further comprising a reservoir inlet being arranged above a planet gear.

10. The axle drive according to claim 4, wherein said washer is adapted to receive oil from outlet and to guide said received oil towards said differential.

11. The axle drive according to claim 1, wherein said differential is disposed on an internal side of a gear casing and a reservoir disposed on an adjacent external side of said gear casing.

12. The axle drive according to claim 7, wherein said washer, when in said disconnect state, allows oil to flow out from said reservoir outlet into said vertical column.

13. The axle drive according to claim 12, wherein said washer extends in parallel with said portion of said gear casing where said outlet is disposed.

14. The axle drive according to claim 7, wherein a width of said column is increased when the disconnect is in the connect position, and decreased when the disconnect is in the disconnect position.

15. The axle drive according to claim 9, wherein said inlet receives oil from said planet gear revolving about a sun gear arranged on said outgoing drive shaft.

* * * * *